(12) United States Patent
Chen et al.

(10) Patent No.: US 6,721,010 B1
(45) Date of Patent: Apr. 13, 2004

(54) METHOD AND STRUCTURE FOR ACCELERATING IMAGE-SENSING SPEED OF A CCD IMAGE-SENSING DEVICE

(75) Inventors: Michael Chen, Hsinchu (TW); Ivan Wu, Taoyuan Hsien (TW)

(73) Assignee: Avision Inc., Hsinchu (TW)

( * ) Notice: Subject to any disclaimer, the term of this patent is extended or adjusted under 35 U.S.C. 154(b) by 783 days.

(21) Appl. No.: 09/641,673

(22) Filed: Aug. 18, 2000

(30) Foreign Application Priority Data

Mar. 29, 2000 (TW) ........................... 89105763 A

(51) Int. Cl.$^7$ ........................... H04N 3/14; H04N 5/235
(52) U.S. Cl. .................. 348/322; 348/230.1; 348/315; 358/483
(58) Field of Search .................. 348/222.1, 229.1, 348/230.1, 294, 297, 298, 311, 312, 314, 315, 316, 322, 323; 250/208.1; 358/482, 483; H04N 3/14, 5/235

(56) References Cited

U.S. PATENT DOCUMENTS

| | | | | |
|---|---|---|---|---|
| 4,703,365 A | * | 10/1987 | Mumford | ..................... 358/483 |
| 4,827,345 A | * | 5/1989 | Nakagawa et al. | ......... 358/482 |
| 4,831,454 A | * | 5/1989 | Tanaka et al. | .............. 358/482 |
| 5,036,397 A | * | 7/1991 | Nagabusa | ................... 348/311 |
| 6,608,706 B1 | * | 8/2003 | Huang | ........................ 358/483 |

\* cited by examiner

Primary Examiner—Ngoc-Yen Vu
(74) Attorney, Agent, or Firm—Birch, Stewart, Kolasch & Birch, LLP

(57) ABSTRACT

The present invention discloses a method and structure for accelerating image-sensing speed in a CCD image-sensing device. According to the present invention, specific shift-control electrodes ($G_{2j-1}$ and $G_{2j}$) are biased to serve as a block unit. After the CCD image-sensing device serially shifts out the charge packets actually corresponding to the image of a sensed object, the CCD image-sensing device can repeat the operation for image sensing without first shifting out the remaining or undesired charge packets, thereby accelerating image-sensing speed.

10 Claims, 4 Drawing Sheets

METHOD AND STRUCTURE FOR ACCELERATING IMAGE-SENSING SPEED OF A CCD IMAGE-SENSING DEVICE

BACKGROUND OF THE INVENTION

1. Field of the Invention

The present invention relates to a method and structure of accelerating image-sensing speed in a CCD image-sensing device.

2. Description of the Related Art

CCD image-sensing devices are widely applied in image processing systems and digital signal processing systems where they serve as shift registers or sequential memory devices with high density. For example, CCD image-sensing devices are utilized in scanners, digital cameras and copy machines.

For conventional scanners or contact image scanners, image processing components are comprised of CCD image-sensing devices. FIG. 1 shows the schematic structure of a conventional CCD image-sensing device. In general, a CCD image-sensing device is composed of the following: a row of image-sensing elements ($P_1 \sim P_n$) for sensing light energy and generating charge packets proportional to the light intensity; a CCD analog shift register 10 with multiple register elements ($SH_1 \sim SH_{2n}$) for receiving and registering (storing) charge packets in parallel; a plurality of shift-control electrodes ($G_1 \sim G_{2n}$); and an output amplifier (OP) for converting each of the charge packets into proportional voltage level(s) ($V_{im}$). The CCD shift register 10 is controlled by two clock signals, $\Phi_1$ and $\Phi_2$, which serially shift the charge packets stored in the register elements to the output amplifier (OP).

FIGS. 2(a) to 2(e) show the charge transferring process in the traditional CCD shift register depicted in FIG. 1. FIG. 2(f) shows the waveforms of the clock signals $\Phi_1$ and $\Phi_2$. The clock signals $\Phi_1$ and $\Phi_2$ are coupled to shift-control electrodes $G_{2a}$ and $G_{2a-1}$ ($1 \leq a \leq n$) respectively.

FIG. 2(a) schematically depicts the structure of CCD shift register 10. For brevity, only 5 shift-control electrodes ($G_1 \sim G_5$) are shown in the CCD shift register and the threshold voltage is displayed as 0. The 5 shift-control electrodes ($G_1 \sim G_5$), and the p-type semiconductor substrate (hereinafter referred to as p-type substrate or $P_{sub}$) together form 5 register elements ($SH_1 \sim SH_5$).

FIG. 2(b) depicts the distribution of potential barriers (step barriers) in the p-type substrate $P_{sub}$ when at time $t_1$, $\Phi_1$ and $\Phi_2$ are at voltage levels 0 and V respectively. The potential barriers beneath shift-control electrodes $G_1$, $G_3$, and $G_5$ are higher than those beneath shift-control electrodes $G_2$ and $G_4$. Hence, the charge packets (depicted as dashed lines) will be stored in the regions beneath the shift-control electrodes $G_2$ and $G_4$ in the p-type substrate $P_{sub}$ (i.e., register elements $SH_2$ and $SH_4$).

FIG. 2(c) depicts the distribution of potential barriers in the p-type substrate $P_{sub}$ when at time $t_2$, both $\Phi_1$ and $\Phi_2$ are at voltage levels V/2. The arrows in FIG. 2(c) demonstrate that when time changes from $t_2$ to $t_3$, the potential barriers beneath the odd numbered shift-control electrodes will decrease and those beneath even numbered shift-control electrodes will increase.

FIG. 2(d) depicts the distribution of potential barriers in the p-type substrate $P_{sub}$ when at time $t_3$, $\Phi_1$ and $\Phi_2$ are at voltage levels 3V/4 and V/4 respectively. Hence, the charge packets stored beneath the register elements $SH_2$ and $SH_4$ are transferred to the regions beneath the shift-control electrodes $G_1$ and $G_3$ with lower potential barriers (i.e., register elements $SH_1$ and $SH_3$).

Lastly, FIG. 2(e) depicts the distribution of potential barriers in the p-type substrate $P_{sub}$ when at time $t_4$, $\Phi_1$ and $\Phi_2$ are at voltage levels V and 0 respectively. During the period measured from $t_1$ to $t_4$, the charge packets are transferred one register element to the right. Similarly, during the periods from $t_5$ to $t_6$ and $t_7$ to $t_8$, the charge packets are also transferred one register element to the right.

The resolution of scanners generally is 600 dpi (dots per inch) or more. When a scanner with 600 dpi resolution scans a document of A4 size (width=21 cm, length=29.7 cm), the CCD image-sensing device used by the scanner must be comprised of at least 7016 ($\cong$29.7 cm/2.54 cm×600) image-sensing elements and 14032 (7016×2) register elements in order to receive and register the charge packets corresponding to the image(s) within the scanned document.

Vendors of CCD image-sensing devices generally provide standard products having more than 10000 image-sensing elements. For example, standard CCD image-sensing devices have 12800 image-sensing elements ($P_1 \sim P_{12800}$) and 25600 register elements ($SH_1 \sim SH_{25600}$). When the standard CCD image-sensing product applies a resolution of 600 dpi to an A4 sized document, only 14032 register elements ($SH_1 \sim SH_{14032}$) actually receive and register charge packets corresponding to the image(s) of the scanned document. The charge packets in register elements ($SH_{14033} \sim SH_{25600}$) are generated by light leakage or some other disturbance and do not correspond to the image(s) of the scanned document. Therefore, the charge packets registered in register elements ($SH_{14033} \sim SH_{25600}$) are undesired and redundant. Yet inevitably, redundant charge packets appear in every image-sensing operation.

According to the descriptions in FIGS. 2(a) to 2(e), the charge packets are serially shifted out of the CCD shift register and transformed to corresponding voltage levels. After shifting out the charge packets registered in register elements ($SH_1 \sim SH_{14032}$), the charge packets registered in register elements ($SH_{14033} \sim SH_{256000}$) are also serially shifted for a displacement of 14032 register elements, netting 11,568 redundant charge packets stored in register elements ($SH_1 \sim SH_{11568}$). In order for the CCD image-sensing device to carry out further image-sensing operations, the redundant charge packets must be serially shifting out of register elements ($SH_1 \sim SH_{11568}$). Otherwise, the remaining (redundant) 11568 charge packets will be added to the newly received 11568 charge packets (from the next scanned image within the document). If not previously disposed of, these remaining, redundant charge packets will cause subsequent scanned image(s) to be distorted. Therefore, to avoid disturbance of the 11568 remaining, desired charge packets, the current art requires additional processing time to serially shift the 11568 remaining charge packets out of the CCD shift register before the CCD image-sensing device carries out its next image-sensing operation. Of course, this additional operation slows down the overall scanning and processing speed(s) of the scanner.

Presently, one method is widely applied in the industry to reduce the additional time required for processing of the remaining charge packets. This method involves increasing the frequency of clock signals $\Phi_1$ and $\Phi_2$ when shifting out the remaining charge packets as a means to accelerate the shift operation of the remaining charge packets thereby reducing additional processing time. Clock signals $\Phi_1$ and $\Phi_2$ generally operate at a normal frequency to shift out the desired charge packets (registered in the register elements $SH_1 \sim SH_{14032}$). However, clock signals $\Phi_1$ and $\Phi_2$ must operate at increasingly higher frequencies to shift out the remaining (redundant) charge packets. Indeed, requiring clock signals $\Phi_1$ and $\Phi_2$ to operate between two frequencies leads to problems of control, increased circuit complexity and higher manufacturing costs.

To mitigate the above mentioned problems, the present invention utilizes a novel method and mechanism for use in CCD image-sensing devices which avoids image distortion without needing to shift the remaining (redundant) charge packets out of the CCD shift register. As a result, the processing and scanning speeds of CCD image-sensing devices and scanners can be accelerated. Attendant benefits include reduced circuit complexity and lower manufacturing costs.

SUMMARY OF THE INVENTION

One objective of the present invention is to provide a method for accelerating image sensing of CCD image-sensing devices. According to the method, after a CCD image-sensing device finishes serially shifting out the charge packets corresponding to the image of the desired sensed object(s), the CCD image-sensing device can repeat the operation for image-sensing without having to shift out remaining redundant or undesired charge packets.

Another objective of the present invention proposes a novel CCD image-sensing device that allows for significantly faster processing speed than is available in conventional CCD image-sensing devices.

The proposed method of accelerating image-sensing speed is appropriate for CCD image-sensing device(s) wherein the CCD image-sensing device has at least a plurality of image-sensing elements $(P_1 \sim P_n)$, a CCD shift register composed of multiple register elements $(SH_1 \sim SH_{2n})$ and multiple shift-control electrodes $(G_1 \sim G_{2n})$ corresponding to the register elements $(SH_1 \sim SH_{2n})$. It is noted that the register elements $SH_1 \sim SH_{2j-2}$ (j<n) only register charge packets that correspond to the desired image of the sensed object.

The method comprises the steps of:

(a) coupling shift-control electrodes $G_{2j-1}$ and $G_{2j}$ to a first potential and a second potential respectively, thereby creating a block unit composed of register elements $SH_{2j-1}$ and $SH_{2j}$;

(b) coupling the odd numbered shift-control electrodes $(G_2, G_3, G_5, \sim G_{2j-5}, G_{2j-3})$ to a first clock signal;

(c) coupling the even numbered shift-control electrodes $(G_2, G_4, G_6, \sim G_{2j-4}, G_{2j-2})$ to a second clock signal;

(d) having the image-sensing elements $(P_1 \sim P_n)$ sense light reflected from a object falling thereupon and generating a plurality of charge packets proportional to the light intensity;

(e) registering the charge packets in register elements $SH_1 \sim SH_2$;

(f) serially shifting out the charge packets registered in register elements $SH_1 \sim SH_{2j-2}$ from the CCD shift register in response to the first and second clock signals whereby the charge packets registered in register elements $SH_{2j+1} \sim SH_{2n}$ are prevented from being shifted into register elements $SH_1 \sim SH_{2j-2}$ by a block unit thereby allowing the CCD image-sensing device to carry out the next sensing operation without needing to shift out the redundant charge packets registered in register elements $SH_{2j+1} \sim SH_{2n}$;

(g) starting the next scanning operation whereby the image-sensing elements $(P_1 \sim P_n)$ sense again and generate a plurality of charge packets;

(h) repeating steps (e)–(g) for registering and shifting out charge packets.

The CCD image-sensing device according to the present invention at least comprises:

(1) a plurality of image-sensing elements $(P_1 \sim P_n)$ for sensing light energy falling thereon to generate a plurality of charge packets proportional to the light intensity;

(2) a CCD shift register made up of a plurality of register elements $(SH_1 \sim SH_{2n})$ and a plurality of shift-control electrodes $(G_1 \sim G_{2n})$ corresponding to the register elements $(SH_1 \sim SH_{2n})$; wherein the register elements $(SH_1 \sim SH_{2j-2}$; j<n) register only those charge packets corresponding to a sensed object's desired image; and (3) an output amplifier for converting the charge packets into proportional voltage levels.

In summary, the odd numbered shift-control electrodes $(G_1, G_3, G_5 \sim G_{2j-5}, G_{2j-3})$ are coupled to a first clock signal, and the even numbered shift-control electrodes $(G_2, G_4, G_6, \sim G_{2j-4}, G_{2j-2})$ are coupled to a second clock signal whereby the charge packets registered in register elements $SH_1 \sim SH_{2j-2}$ are serially shifted out of the CCD shift register in response to the first and second clock signals.

It is noted that shift-control electrodes $G_{2j-1}$ and $G_{2j}$ are coupled to a first potential and a second potential respectively. This new aspect of the art allows register elements $SH_{2j-1}$ and $SH_{2j}$ to serve as a block unit thereby blocking the charge packets registered in register elements $SH_{2j-1} \sim SH_{2n}$ from being shifted forward into the register elements $SH_1 \sim SH_{2j-2}$.

BRIEF DESCRIPTION OF THE DRAWINGS

The subsequent detailed description of the present invention's preferred embodiments are illustrated by way of example and hence are not intended to limit the invention solely to the embodiments described herein. The present invention's embodiments will best be understood in conjunction with the accompanying drawings in which.

DETAILED DESCRIPTION OF THE PREFERRED EMBODIMENTS

Figure 3:
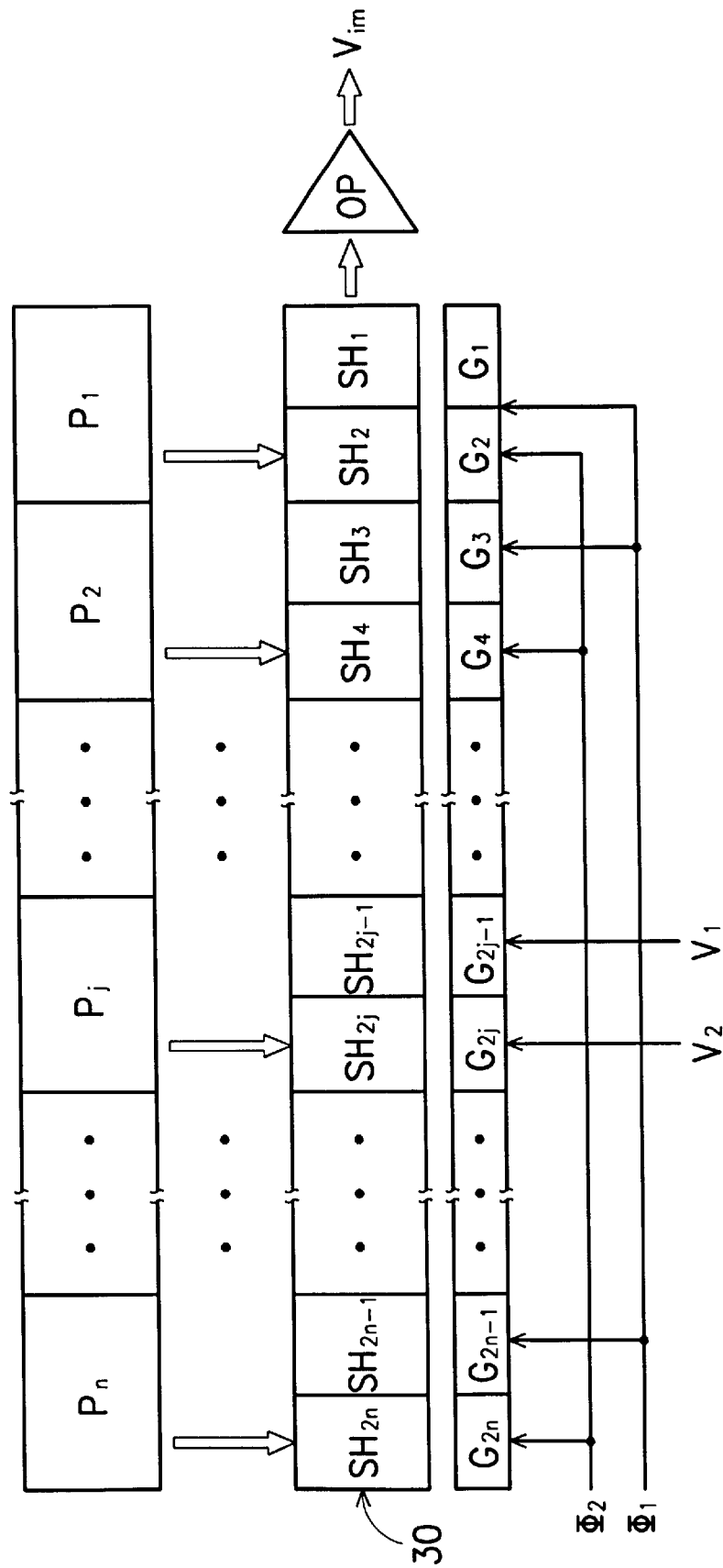
FIG. 3 shows the schematic structure of a CCD image-sensing device according to the present invention.

FIG. 3 shows the schematic structure of a CCD image-sensing device according to the present invention. In FIG. 3, the CCD image-sensing device at a minimum comprises: a plurality of image-sensing elements $(P_1 \sim P_n)$ for sensing light energy and generating a plurality of charge packets proportional to the light intensity; a CCD shift register 30 having multiple register elements $(SH_1 \sim SH_{2n})$ for registering the charge packets; a plurality of shift-control electrodes $(G_1 \sim G_{2n})$; and an output amplifier (OP) for converting the charge packets into proportional voltage levels.

Figure 1:
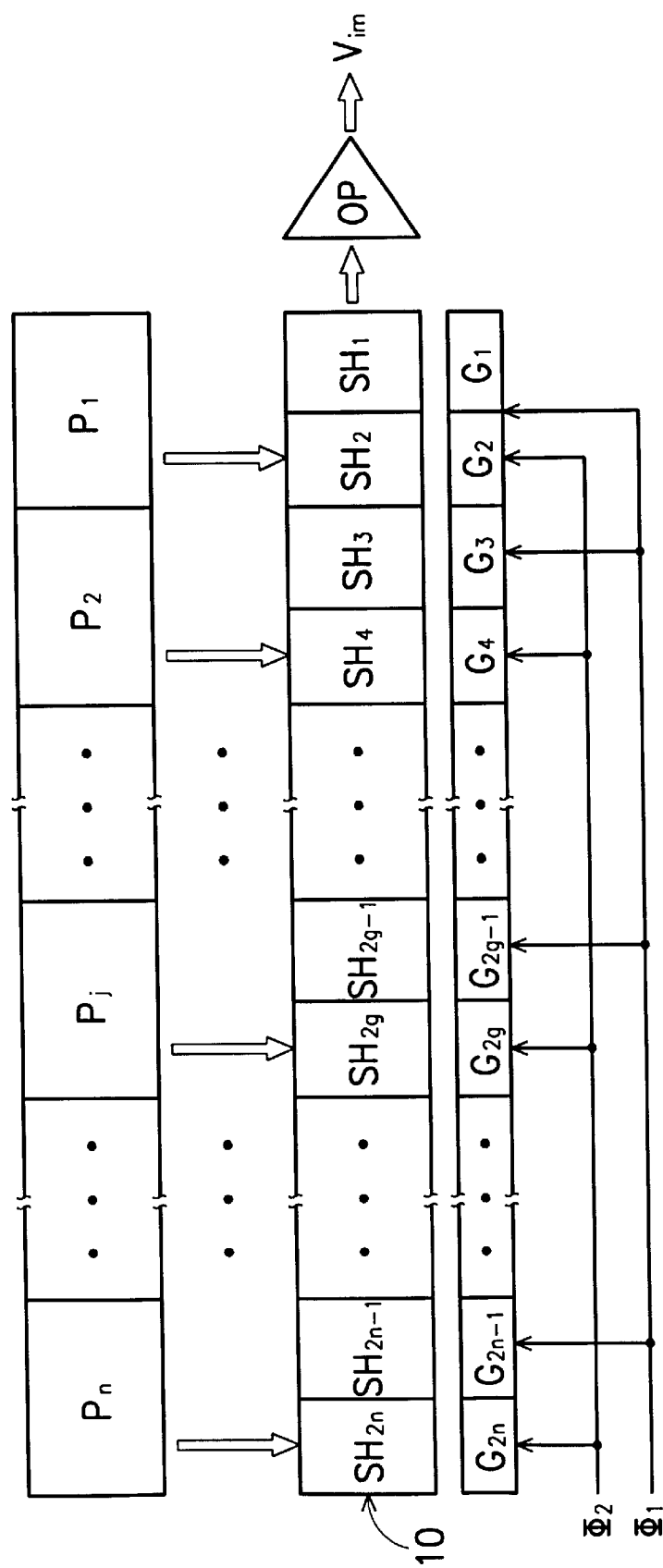
FIG. 1 shows the schematic structure of a conventional CCD image-sensing device.
Figure 2:
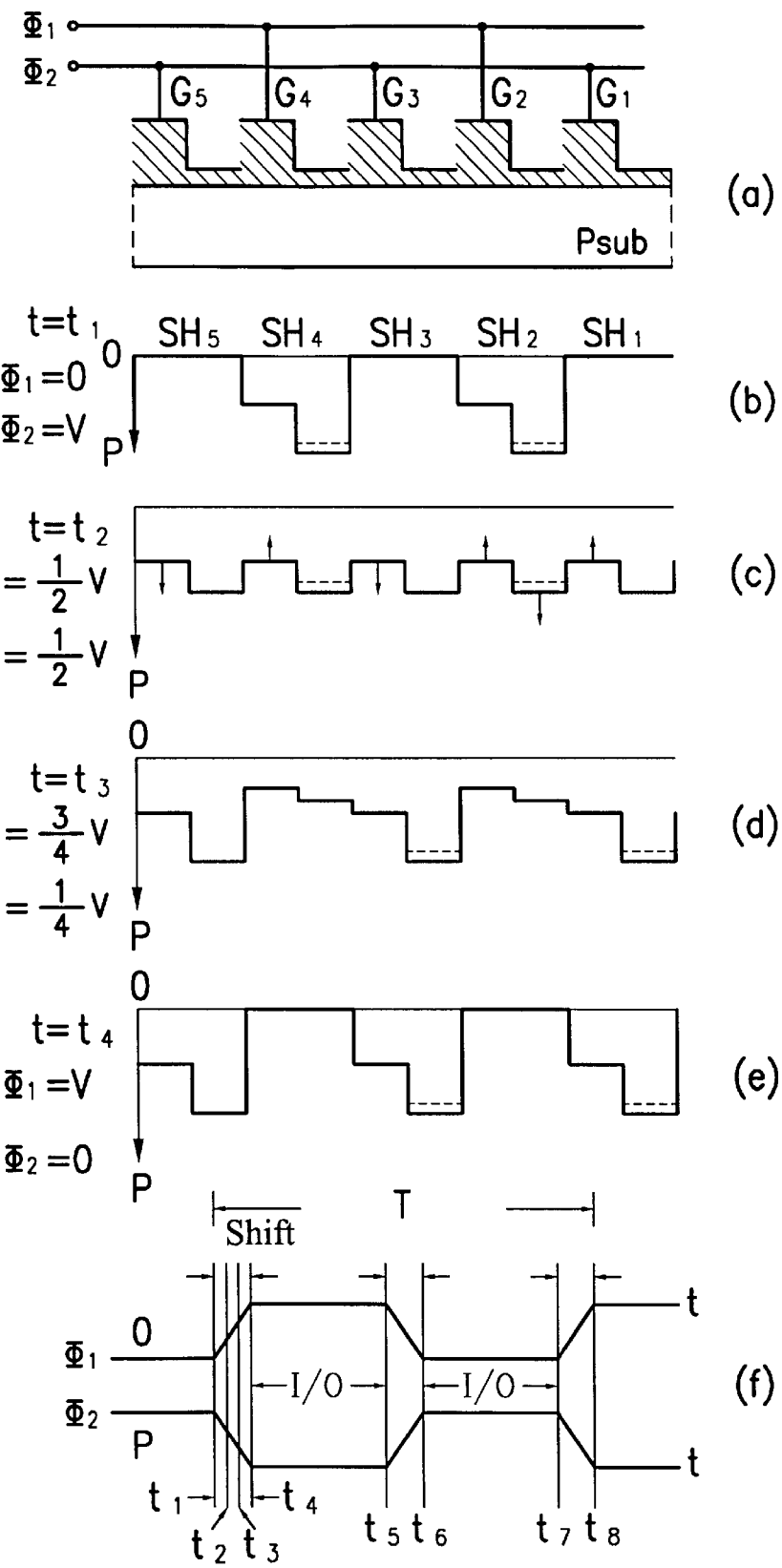
FIGS. 2(a) to 2(e) schematically show the charge transferring process in the CCD shift register depicted by FIG. 1.
FIG. 2(f) shows the waveforms of the clock signals $\Phi_1$ and $\Phi_2$.

The odd numbered shift-control electrodes $(G_1, G_3, G_5, \sim G_{2j-5}, G_{2j-3})$ are coupled to a first clock signal $\Phi_1$ and the even numbered shift-control electrodes ($G_2$, $G_4$, $G_6$,~$G_{2j-4}$, $G_{2j-2}$) are coupled to a second clock signal $\Phi_2$. Conversely, the odd numbered shift-control electrodes ($G_{2j+1}$, $G_{2j+3}$~$G_{2n-3}$, $G_{2n-1}$) can be coupled to first clock signal 4, and the even numbered shift-control electrodes ($G_{2j+2}$, $G_{2j+4}$~$G_{2n-2}$, $G_{2n}$) could be coupled to second clock signal $\Phi_2$. The first clock signal $\Phi_1$ is the complement signal of the second clock signal $\Phi_2$. Again, the waveforms of the first and second signals are depicted by FIG. 2(f).

It is noted that shift-control electrodes $G_{2j-1}$ and $G_{2j}$ are coupled to a first potential $V_1$ and a second potential $V_2$, respectively. As a result, the register elements $SH_{2j-1}$ and $SH_{2j}$ serve as a block unit thereby preventing the charge packets registered in register elements $SH_{2j+1}$~$SH_{2n}$ from being shifted into register elements $SH_1$~$SH_{2j-2}$.

The charge packets registered in the register elements $SH_1$~$SH_{2j-2}$ are serially shifted out of CCD shift register 30 to the output amplifier OP. Further, the remaining charge packets in register elements $SH_{2j+1}$~$SH_{2n}$ are prevented from being transferred forward into register elements $SH_1$~$SH_{2j}$ by the block unit.

Again, considering a scanner with 600 dpi resolution for scanning a document of A4 size, the CCD image-sensing device must at least be comprised of 7016 (j–1) image-sensing elements and 14032 (2j–2) register elements. According to the present invention, when fabricating standard CCD image-sensing devices with 12800 (n) image-sensing elements, manufacturers can couple the first potential $V_1$ (0V) and the second potential $V_2$ (+V) to the shift-control electrodes $G_{14033}$ and $G_{14034}$ ($G_{2j-1}$ and $G_{2j}$) respectively. Thus, register elements $SH_{14033}$ and $SH_{14034}$ ($SH_{2j-1}$ and $SH_{2j}$) can now serve as a blocking unit. With the blocking unit in place, the charge packets in register elements $SH_1$~$SH_{14032}$ can now be shifted out of the CCD shift register 30 in response to the first and second clock signals $\Phi_1$ and $\Phi_2$. Additionally, the remaining charge packets in register elements $SH_{14033}$~$SH_{25600}$ are effectively blocked from being shifted forward into register elements $SH_1$~$SH_{14032}$.

FIGS. 4(a) to 4(e) schematically show the charge transferring process in the CCD shift register 30 depicted in FIG. 3. For brevity, only a portion of the register elements and shift-control electrodes of the CCD shift register 30 are shown in FIG. 4(a).

A method of accelerating image sensing as proposed by the present invention is thereby achieved because the CCD image-sensing device is able to immediately repeat the image-sensing operation without shifting out the remaining or undesired charge packets in register elements $SH_{14033}$~$SH_{25600}$. Hence, processing speed is increased. The method for accelerating image-sensing speed is described hereinafter in detail with reference to FIG(S)., 3 and 4. The method for accelerating image-sensing speed comprises the following steps:

First, shift-control electrodes $G_{14033}$ and $G_{14034}$ ($G_{2j-1}$ and $G_{2j}$; j=7017) are coupled to a first potential $V_1$ (0V) and a second potential $V_2$ (+V) respectively, thereby creating a blocking unit from register elements $SH_{14033}$ and $SH_{14034}$ (i.e., $SH_{2j-1}$ and $SH_{2j}$).

In FIG. 4(a), the odd numbered shift-control electrodes $G_1$, $G_3$, $G_5$,~$G_{14029}$ (i.e., $G_{2j-5}$) and $G_{14031}$ (i.e., $G_{2j-3}$) are coupled to first clock signal $\Phi_1$. The even numbered shift-control electrodes $G_2$, $G_4$, $G_6$,~$G_{14030}$ (i.e., $G_{2j-4}$) and $G_{14032}$ (i.e., $G_{2j-2}$) are coupled to second clock signal $\Phi_2$.

Conversely, the same result could be achieved by coupling the odd numbered shift-control electrodes $G_{14035}$, $G_{14037}$~$G_{25599}$ (i.e., $G_{2n-1}$) to the first clock signal $\Phi_1$, and the even numbered shift-control electrodes $G_{14036}$, $G_{14038}$~$G_{25600}$ (i.e., $G_{2n}$) to the second clock signal $\Phi_2$.

When the CCD image-sensing device begins to sense an object, image-sensing elements $P_1$~$P_{12800}$ sense corresponding light energy and generate charge packets proportional to the light intensity. These charge packets are registered in even numbered register elements $SH_{2j}$ (j=1~12800). As shown in FIG. 4(b), the register elements $SH_2$~$SH_{14030}$ and $SH_{14032}$ register the desired charge packets corresponding to the sensed object while register elements $SH_{14034}$~$SH_{25600}$ record the redundant charge packets generated by light leakage or other disturbance(s).

Under the control of first and second clock signals $\Phi_1$ and $\Phi_2$, the charge packets registered in register elements $SH_2$~$SH_{14030}$ will be serially shifted out of the CCD shift register 30. The shift process is described hereinafter in detail.

At time $t_1$, $\Phi_1$ and $\Phi_2$ are at voltage levels 0 and V. The distribution of potential barriers (step barriers) in the p-type substrate $P_{sub}$ is depicted by FIG. 4(b). The potential barriers beneath odd numbered shift-control electrodes $G_{14029}$ $G_{14037}$ are higher than those beneath even numbered shift-control electrodes $G_{14030}$~$G_{14036}$. Hence, the charge packets (depicted as dashed lines) will be registered in the regions beneath the shift-control electrodes $G_{14030}$~$G_{14036}$ in the p-type substrate $P_{sub}$ (i.e., the even numbered register elements $SH_{14030}$~$SH_{14036}$).

At time $t_2$, both $\Phi_1$ and $\Phi_2$ are at voltage levels V/2, and the distribution of potential barriers in the p-type substrate $P_{sub}$ is depicted by FIG. 4(c). The arrows depicted in FIG. 4(c) illustrate that as time changes from $t_2$ to $t_3$, the potential barriers beneath odd numbered shift-control electrodes ($G_{14029}$~$G_{14031}$ and $G_{14035}$~$G_{14037}$) will decrease and those beneath even numbered shift-control electrodes ($G_{14030}$~$G_{14032}$ and $G_{14036}$) will increase.

At time $t_3$, $\Phi_1$ and $\Phi_2$ are at voltage levels 3V/4 and V/4 respectively and the distribution of potential barriers in the p-type substrate $P_{sub}$ is depicted by FIG. 4(d). IN this example, the charge packets registered beneath register elements $SH_{14030}$ and $SH_{14032}$ are transferred to the regions beneath shift-control electrodes with lower potential barriers (i.e., register elements $SH_{14029}$ and $SH_{14031}$) respectively. Also, the charge packet registered beneath register element $SH_{14036}$ is transferred to the region beneath the adjacent shift-control electrode with lower potential barrier (i.e., register element $SH_{14035}$).

Figure 4:
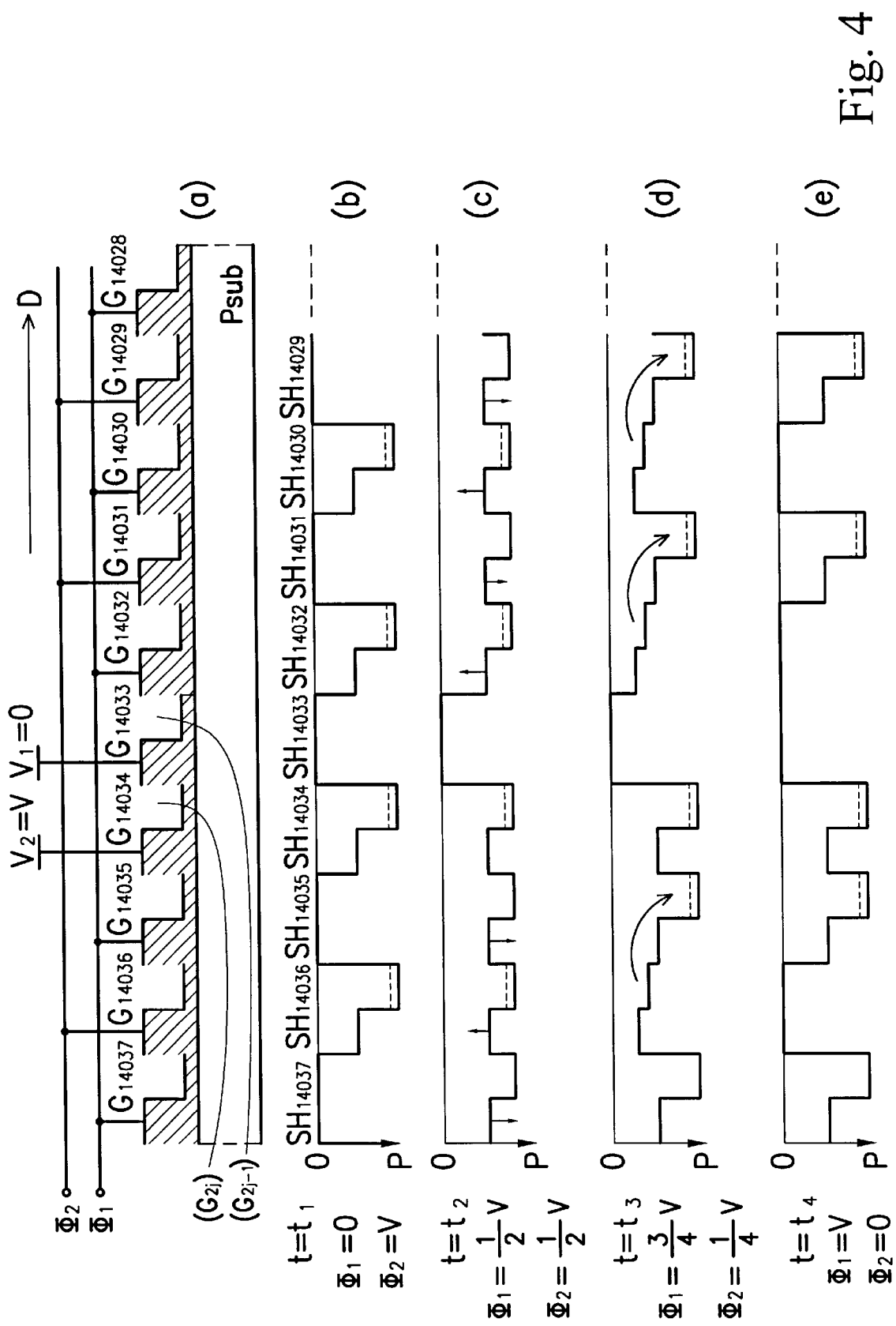
FIGS. 4(a) to 4(e) schematically show the charge transferring process in the CCD shift register depicted by FIG. 3.

Finally, at time $t_4$, $\Phi_1$ and $\Phi_2$ are at voltage levels V and 0 respectively and the distribution of potential barriers in the p-type substrate $P_{sub}$ is depicted by FIG. 4(e). During the period from $t_1$ to $t_4$, the charge packets are transferred toward the right side direction in FIG. 4 (represented by the arrow D) for a displacement of one register element. Similarly, during the periods from $t_5$ to $t_6$ and $t_7$ to $t_8$, the charge packets are also transferred toward the right side direction in FIG. 4 again resulting in displacement of one register element.

According to the transferring process described above, the desired charge packets registered in register elements $SH_2$~$SH_{14030}$ and $SH_{14032}$ are serially shifted out of CCD shift register 30. However, the redundant (remaining) charge packets registered in register elements $SH_{14034}$~$SH_{25600}$ are not shifted into the register elements $SH_1$~$SH_{14032}$ because the barrier potentials beneath the shift-control electrodes $G_{14033}$ and $G_{14034}$ have not changed in response to the first and second clock signals $\Phi_1$ and $\Phi_2$.

After completing the operation of serially shifting the desired charge packets registered in the register elements $SH_2 \sim SH_{14030}$ and $SH_{14032}$ out of CCD shift register 30, the CCD image-sensing device can carry out the next image-sensing operation. As a result, image-sensing elements $P_1 \sim P_n$ are able to commence a new sensing operation generating a plurality of new charge packets. The CCD image-sensing device again repeats the steps of registering all new charge packets into the register elements and shifting the desired new charge packets out of the CCD shift register 30.

It is therefore clear that after the CCD image-sensing device finishes serially shifting out the desired charge packets that actually correspond to the image of a sensed object, the CCD image-sensing device can immediately repeat the next image-sensing operation without shifting out the remaining or undesired charge packets. In contrast, the conventional CCD image-sensing device requires additional time to serially shift out the remaining charge packets thereby allowing the CCD image-sensing device to repeat the next image-sensing operation. Hence, the CCD image-sensing device according to the present invention provides for faster processing speed than is currently available in a conventional CCD image-sensing device.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A CCD image-sensing device comprising:
    a plurality of image-sensing elements ($P_1 \sim P_n$) for sensing light energy falling thereupon to generate a plurality of charge packets proportional to the light intensity;
    a CCD shift register having a plurality of register elements ($SH_1 \sim SH_{2n}$) for registering the charge packets, wherein the register elements ($SH_1 \sim SH_{2j-2}$; j<n) register only those charge packets that correspond to the image of a sensed object; and
    a plurality of shift-control electrodes ($G_1 \sim G_{2n}$), wherein the odd numbered shift-control electrodes ($G_1$, $G_3$, $G_5, \sim G_{2j-5}$, $G_{2j-3}$) are coupled to a first clock signal, and the even numbered shift-control electrodes ($G_2$, $G_4$, $G_6, \sim G_{2j-4}$, $G_{2j-2}$) are coupled to a second clock signal, thereby allowing the charge packets registered in register elements $SH_1 \sim SH_{2j-2}$ to be serially shifted out from the CCD shift register in response to the first and second clock signals;
    wherein shift-control electrodes $G_{2j-1}$ and $G_{2j}$ are coupled to a first potential and a second potential, respectively, thereby creating a block unit composed of register elements $SH_{2j-1}$ and $SH_{2j}$ which prevent or block the charge packets registered in register elements $SH_{2j+1} \sim SH_{2n}$ from being shifted into register elements $SH_1 \sim SH_{2j-2}$.

2. The CCD image-sensing device as claimed in claim 1, wherein the first clock signal is a complement signal of the second clock signal.

3. The CCD image-sensing device as claimed in claim 1, wherein the voltage of the first potential is less than that of the second potential.

4. The CCD image-sensing device as claimed in claim 3, wherein the voltage of the first potential is 0 V and the voltage of the second potential is positive.

5. The CCD image-sensing device as claimed in claim 1, wherein the odd numbered shift-control electrodes $G_{2j-1}$, $G_{2j-3} \sim G_{2n-1}$ are coupled to the first clock signal, and the even numbered shift-control electrodes $G_{2j+2}$, $G_{2j+4} \sim G_{2n}$ are coupled to the second clock signal.

6. A method of accelerating image-sensing speed, appropriate for a CCD image-sensing device at least having a plurality of image-sensing elements ($P_1 \sim P_n$) and a CCD shift register made up of a plurality of register elements ($SH_1 \sim SH_{2n}$) and a plurality of shift-control electrodes ($G_1 \sim G_{2n}$) corresponding to register elements ($SH_1 \sim SH_{2n}$), the method comprising the steps of:
    coupling shift-control electrodes $G_{2j-1}$ and $G_{2j}$ to a first potential and a second potential respectively thereby creating a block unit composed of register elements $SH_{2j-1}$ and $SH_{2j}$;
    coupling the odd numbered shift-control electrodes ($G_1$, $G_3$, $G_5, \sim G_{2j-5}$, $G_{2j-3}$) to a first clock signal;
    coupling the even numbered shift-control electrodes ($G_2$, $G_4$, $G_6, \sim G_{2j-4}$, $G_{2j-2}$) to a second clock signal;
    having image-sensing elements ($P_1 \sim P_n$) sense light reflected from an object falling thereupon and generating a plurality of charge packets proportional to light intensity;
    registering the charge packets in register elements $SH_1 \sim SH_{2n}$ wherein register elements $SH_1 \sim SH_{2j-2}$ (j<n) register only the charge packets corresponding to the sensed object;
    serially shifting out the charge packets registered in register elements $SH_1 \sim SH_{2j-2}$ from the CCD shift register in response to the first and second clock signals wherein the charge packets registered in register elements $SH_{2j+1} \sim SH_{2n}$ are prevented from being shifted into register elements $SH_1 \sim SH_{2j-2}$ by the block unit thereby allowing the CCD image-sensing device to sense subsequent images without shifting out the charge packets registered in register elements $SH_{2j+1} \sim SH_{2n}$;
    starting the next scanning operation whereby the image-sensing elements ($P_1 \sim P_n$) sense again and generate a plurality of charge packets; and
    repeating the operations of registering and shifting out charge packets.

7. The method as claimed in claim 6, wherein the first clock signal is the complement signal of the second clock signal.

8. The method as claimed in claim 6, wherein the voltage of the first potential is less than that of the second potential.

9. The method as claimed in claim 8, wherein the voltage of the first potential is 0 V and the voltage of the second potential is positive.

10. The method as claimed in claim 6, wherein the odd numbered shift-control electrodes $G_{2j+1}$, $G_{2j+3} \sim G_{2n-1}$ are coupled to the first clock signal, and the even numbered shift-control electrodes $G_{2j+2}$, $G_{2j+4} \sim G_{2n}$ are coupled to the second clock signal.

* * * * *